US007131593B2

(12) United States Patent
Steinkogler et al.

(10) Patent No.: US 7,131,593 B2
(45) Date of Patent: Nov. 7, 2006

(54) METHOD FOR PROCESSING SHEET MATERIAL

(75) Inventors: Alexander Steinkogler, München (DE); Alfred Schmidt, München (DE)

(73) Assignee: Giesecke & Devrient GmbH, Munich (DE)

( * ) Notice: Subject to any disclaimer, the term of this patent is extended or adjusted under 35 U.S.C. 154(b) by 624 days.

(21) Appl. No.: 09/718,473

(22) Filed: May 14, 2001

(65) Prior Publication Data

US 2004/0211829 A1 Oct. 28, 2004

(30) Foreign Application Priority Data

Oct. 6, 2000 (DE) ................................ 100 49 435

(51) Int. Cl.
*G06K 19/00* (2006.01)

(52) U.S. Cl. ....................................... 235/487; 235/379

(58) Field of Classification Search ................ 235/487, 235/379; 382/135; 414/798; 198/460; 209/534, 209/553, 554

See application file for complete search history.

(56) References Cited

U.S. PATENT DOCUMENTS 3,996,667 A * 12/1976 Barnard ...................... 294/1.1
4,020,616 A * 5/1977 Nakajima et al. ........... 250/548
4,518,075 A * 5/1985 Aykut et al. ............. 198/460.1
4,664,417 A 5/1987 Rosenstrach et al.
4,716,438 A * 12/1987 Farrell ......................... 399/84
5,064,222 A * 11/1991 Legault ....................... 283/71
5,387,078 A * 2/1995 Todaro ....................... 271/113
5,917,930 A * 6/1999 Kayani et al. .............. 209/534
6,065,672 A 5/2000 Haycock
6,305,550 B1 * 10/2001 Berz .......................... 209/534
6,510,238 B1 * 1/2003 Haycock ..................... 382/135
6,612,500 B1 * 9/2003 Myer, Sr. .................... 235/493

FOREIGN PATENT DOCUMENTS

EP 0614118 A1 9/1994
EP 0710944 A2 5/1996
WO WO 84/00078 1/1984

* cited by examiner

*Primary Examiner*—Kimberly D. Nguyen
(74) *Attorney, Agent, or Firm*—Bacon & Thomas PLLC

(57) ABSTRACT

A method for separating and processing successively different groups of sheet material in a sheet processing device that includes utilizing at least one separating card arranged to provide an indication of a separate group of sheet material to the sheet processing device and at least one information carrier arranged to provide information to the sheet processing device concerning a group of sheet material.

15 Claims, 3 Drawing Sheets

METHOD FOR PROCESSING SHEET MATERIAL

BACKGROUND OF THE INVENTION

The present invention relates to a method for processing sheet material, in particular papers of value such as bank notes, checks, etc., by which different groups of sheet material are processed successively, the different groups of sheet material being separated for processing.

A method and bank note processing machine for processing different groups of bank notes are known for example from JP 62-82493A. The different groups of bank notes correspond to deposits by different depositors which are separated by separator cards. The separator cards are inserted between the different deposits to separate them. The separator cards may be disposed at the beginning, the end or the beginning and end of the group of bank notes forming the particular deposit. The separator cards may contain information, for example, about the depositor and/or the deposit. Further, the separator cards are designed so as to be recognized automatically by the bank note processing machine during processing. When a separator card is recognized, the bank note processing machine can enter in the books the associated group of bank notes for the corresponding deposit or depositor. For recognizing the separator cards, the bank note processing machine has magnetic sensors which, on the one hand, are used for reading the information coded on a magnetic stripe on the separator cards. On the other hand, the signals of the sensors can be used to recognize the separator cards even when the latter are masked by bank notes, as may occur upon multiple removal. Thus it is ensured with relatively high probability that the separator cards are always recognized, so that at least the boundaries between individual deposits can be recognized.

A similar method for semicontinuous processing of bank notes is known from WO 98/05006 A1.

However, known methods have the disadvantage tea;t the preparation, i.e. separation by an operator using separator cards, is error-prone, in particular when the operator must provide such separator card with information about the associated deposit, because this frequently involves transfer errors and mix-ups. In addition, when the magnetic stripe of the separator card is masked it is frequently impossible to read the coded information contained therein, which prevents recognition of the individual groups of sheet material.

SUMMARY OF THE INVENTION

The problem of the present invention is therefore to state a method for processing sheet material, in particular papers of value such as bank notes, checks, etc., by which different groups of sheet material are processed successively, the different groups of sheet material being separated for processing, which allows a processing of the different groups of sheet material which is improved both with respect to recognition of the different groups of sheet material by the bank note processing machine and with respect to the proneness to error during preparation by an operator. In addition, means should be stated for carrying out the method.

The invention starts out from the consideration that at least one information means is used besides a strict separating means for separating and processing each group of sheet material. The separating means thus serves only to separate the individual groups of sheet material from each other, whereas the information means is used for providing information about the particular group of sheet material for processing.

The advantage of the invention is in particular that the proposed division into a separating means and at least one information means facilitates the processing of different groups of sheet material because the information means can already be added to the particular group of sheet material before actual processing on the bank note processing machine. This means that the information identifying the particular group of sheet material can be transferred to the information leans when the particular group of sheet material is being formed. Thus, no mix-ups, false associations or transfer errors upon later association of the information can occur. Further, processing by the bank note processing machine is improved because if the separating means is not recognized the faulty processing is recognized upon recognition of the following information means. Conversely, nonrecognition of the information means can accordingly be recognized when the separating means is recognized. If a plurality of information means are used for identifying a group of sheet material, the described possibilities of analysis for recognizing faulty processing are improved, for example as it is then possible to form subgroups. Furthermore, the use of a plurality of information means attains a redundancy for the information or parts of the information which contributes to increasing the avoidance of recognition errors.

BRIEF DESCRIPTION OF THE DRAWINGS

Further advantages of the present invention will result from the dependent claims and the following description of examples with reference to figures, in which:

DETAILED DESCRIPTION OF THE INVENTION

The processing of different groups of sheet material will be described in the following by way of example with reference to the processing of different groups of bank notes, to be referred to in the following as deposits. The different deposits are separated from each other by separating means, for example separator cards. Additionally the different deposits each contain at least one information means, for example information cards. For processing the different deposits a bank note processing machine is used.

Figure 1:
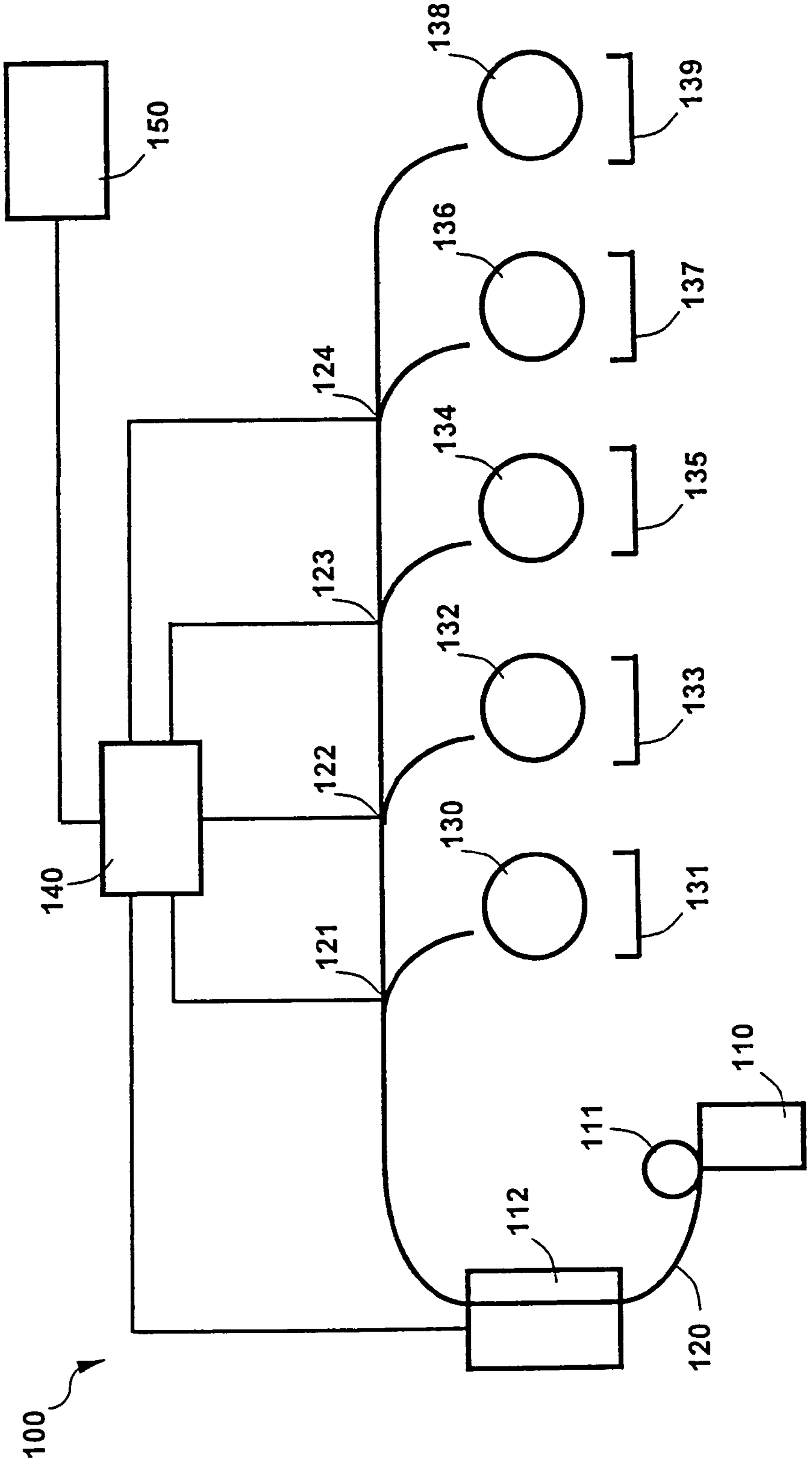
FIG. 1 shows a basic structure of a bank note processing machine for processing different groups of sheet material.

FIG. 1 shows a basic structure of bank note processing machine 100 for processing different groups of bank notes or deposits. Bank note processing machine 110 has input unit 110 in which the different deposits are inserted. Connected to input unit 110 is singler 111 which removes single bank notes of the different deposits and the separator cards and information cards from input unit 110 and delivers them to transport system 120. Transport system 12e transports the single bank notes as well as separator cards and information cards through sensor device 112 which determines data from the bank notes to indicate for example authenticity, state, denomination, etc. Furthermore, in sensor device 112 the separator cards are recognized and information contained on the information card is detected by sensor device 112. The determined data of the bank notes, the presence of separator cards and the detected information of the information cards are transmitted to control device 140 which evaluates the data, the presence of separator cards and the information in order to control the further flow of bank notes or separator cards and information cards through bank note processing machine 100. For this purpose control device 140 acts on switches 121 to 124 which are part of transport system 120 and allow the bank notes or separator cards and information cards to be deposited in output units 130 to 139 according to given criteria. Output units 130 to 139 can be formed for example as spiral pocket stackers which stack the bank notes or separator cards and information cards to be deposited in bins 131, 133, 135, 137, 139 by means of rotating units 130, 132, 134, 136, 138 having spiral pockets. Separator cards and information cards are deposited in special output unit 130, 131 in which for example nonrecognized or faulty bank notes are also deposited.

The separator cards are used, as mentioned above, for recognizing the boundaries of different deposits during automatic bank note processing. Additionally, the separator cards can be used for mutually delimiting rejected bank notes, i.e. bank notes classified as false or faulty when checked by sensor device 112 and control device 140.

The separator cards are documents which can be singled, transported and stacked like bank notes, bank note processing machine 100. They are designed so as to be clearly distinguished from bank notes and can therefore be recognized by bank note processing machine 100. The separator cards differ from the bank notes to be processed in physical properties, such as size, shape and thickness, in their print, through color and pattern or other features, e.g. physical properties such as magnetic, electroconductive or fluorescent areas.

The properties of the separator cards, e.g. caused by conductive elements, allow reliable recognition of the separator cards since the conductive elements can be detected reliably even in the case of multiple removable when a plurality of bank notes or bank notes and separator cards instead of one bank note or separator card are grasped by singler 111, causing the separator cards to be masked. It is of special advantage if these patterns differ so clearly from conductive elements on bank notes (e.g. security thread or other applied conductive security elements) that the presence of a separator card is not erroneously indicated of a present separator card missed even in the case of multiple removal with partially overlapping bank notes. One way to do this is to apply a plurality of conductive bars to the separator card and design evaluation so that separator card recognition takes places only if at least three or tour of said bars are present.

Use of conductive patterns is advantageous over known methods, e.g. based on magnetic bars, in that conductivity is largely independent of the distance for the detecting measuring system and thus involves higher reliability. A further advantage is that conductivity is also detectable at a standstill or very slow run of the transport system, while magnetic evaluation involves a dependence of signal strength on transport speed. Such conductive elements can be detected for example by sensors which feed in a high-frequency electric field at one point and have a receiver for high-frequency fields at another point. When a conductive transmission path is present there is capacity coupling between transmitter and receiver and thus a reliable detection.

Further possibilities for reliable recognition of a separator card are applied inductive elements or antenna coils. The latter can be wound in the form of a flat coil by a conventional method or be printed as a coil with the aid of conductive ink. Detection can be effected for example by feeding in a high-frequency electric field and by the interaction of said coil in the form of an influence on the frequency of a resonant circuit formed with the transmitter elements.

Further possibilities for reliable recognition of a separator card are given by forming certain physical properties. The latter can be realized for example by a special stiffness of the carrier material to be detected by a force measurement on a deflection or in another way. Other recognition methods can be based on a special design e.g. in the behavior of reflecting sound, the production of special soundwaves during bank note transport or special behavior when subjected to electromagnetic waves. One can likewise evaluate optical properties such as fluorescence.

The separator cards are inserted during preparation between the groups of bank notes of the different deposits which are to be separately tested and accounted. The separator cards can be used as lead cards, i.e. at the beginning of a deposit, or trailing cards, i.e. at the end of a deposit, or also in combination of said two variants. The same applies to the information cards.

During preparation of the individual deposits, i.e. by the depositor or upon insertion of the separator cards by an operator of bank note processing machine 100, the data of the deposits are collected and transferred to the information cards. The deposit data may be present for example in the form of an accompanying slip (delivery note). Said data may be applied by hand or printed in machine-readable fashion, or they may be already known because the depositor has reported the data of the deposit by telephone (telebanking) or in another way. The data association is produced on the information card e.g. by means of a unique mark, e.g. a bar code. In a further case of application it may be that the value of the deposit is unknown and to be ascertained only during bank note processing.

In order for the depositor to provide the deposit data for processing with bank note processing machine 100 there are a number of possibilities.

A first approach is for the depositor to produce a document to be used as an information card. This may be done using special programs permitting the depositor to collect and enter in the books the data of his deposit, the program automatically executing a data transfer with the collected data to the service provider, e.g. via the Internet or other telecommunication channels, and an accompanying slip being printed out at the depositor's end which is enclosed in the deposit and can be used directly as a machine-readable information card during bank note processing.

Figure 2:
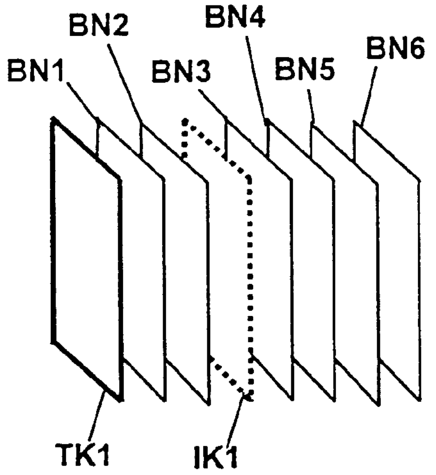
FIG. 2 shows a first arrangement of a group of sheet material with affiliated separating means and information means.
Figure 3:
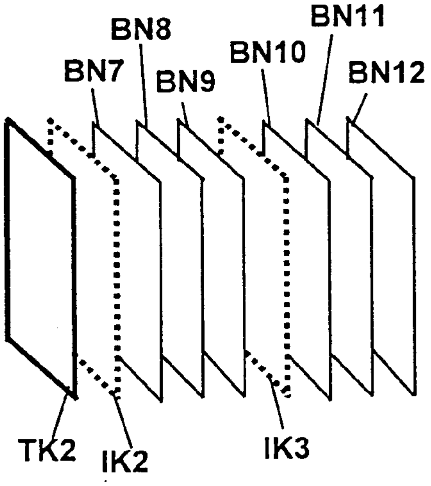
FIG. 3 shows a second arrangement of a group of sheet material with affiliated separating means and information means.
Figure 4:
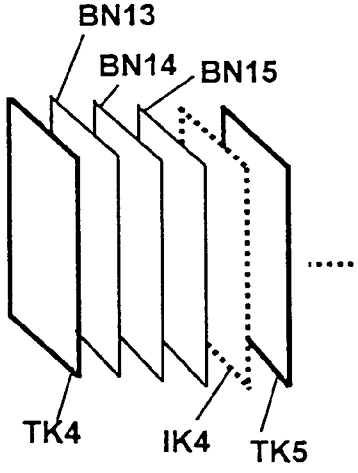
FIG. 4 shows a third arrangement of a group of sheet material with affiliated separating means and information means.

With reference to the structure of groups of sheet material or deposits shown in FIGS. 2 to 4 the function of the abovementioned separating means and the information means shall be described in more detail. Obviously, the structure of groups of sheet material shown in FIGS. 2 to 4 is exemplary. Any other structure impossible, in particular more bank notes can be present than shown in the examples.

FIG. 2 shows a first deposit consisting of separating means TK1, bank notes BN1 to BN6 and one information carrier IK located between bank notes BN2 and BN3.

FIG. 3 shows a second deposit consisting of separating means TK2, bank notes BN7 to BN12 and two information carriers IK2 and IK3.

FIG. 4 shows a third deposit consisting of separating means TK4, bank notes BN13 to BN15 and one information carriers IK4. Information carriers IK4 is followed by a further deposit shown by separating means TK5 and a dotted line in FIG. 4.

Separating means TK1 to TK5 can be formed as separator cards, as shown in FIG. 2 to 4. Separating means TK1 to TK5 are recognized by sensor device 112 with reference to specific properties, as described.

Information carriers IK1 to IK4 formed as information cards bear information, as described above. Separating means TK1 to TK5 serve only to separate the different deposits, whereas information cards IK1 to 1K4 are used to provide the information required for processing. Information cards IK1 to 1K4 may be of simple design, in particular they lack the special properties of separating means TK1 to TK5. This permits corresponding information cards IK1 to IK4 to be already prepared and provided with the desired information by the depositor making the particular deposit.

During later processing of the different deposits with bank note processing machine 100 an operator then merely inserts separator cards TK1 to TK5 between the individual deposits. Separator cards TK1 to TK5 can also be already inserted by the depositor. In the simplest case, information cards IK1 to IK4 can also be formed by part of the sheet material itself, for example the serial number of a bank note can be used for unique identification so that the bank note forms the information card. The corresponding data, such as depositor, deposited amount, etc., are then associated with the serial number in control unit 140 of bank note processing machine 100 for processing.

As shown in FIGS. 2 to 4, information cards IK1 to IK4 can be disposed at any points within the particular deposit, after particular separator card TK1 to TK4.

In the first deposit in FIG. 2, information card IK1 is located for example after separator card TK1 and bank notes BN1 and BN2.

In the second deposit in FIG. 3, information card IK2 is located directly after separator card TK2 and further information card IK3 between bank notes BN9 and BN10. By using two information cards IK2 and IK3 within the second deposit one can thus also form subgroups of bank notes BN7 to BN9 and BN10 to BN12. In the same way one can form further subgroups by using further information cards. Said subgroups n correspond for example to individual cash registers of a supermarket which together form the supermarket's deposit.

The third deposit in FIG. 4 begins with separator card TK4 which is followed by bank totes BN13 to BN15 to be processed. The end of the third deposit is formed by information card IK4. Directly after information card IK4 comes separator card TK5 of the next deposit. The structure of the third deposit has the advantage that the processing of bank notes BN13 to BN15 can be performed especially reliably because the given order (separator card TK4—bank notes BN13 to BN15—information card IK4) ensures that errors, as caused e.g. by multiple removals and resulting permutations in the order, can be recognized. After recognition of separator card TK4, bank notes BN13 to BN15 must follow first, then information card IK4 After that, either the processing operation must be over—if no further deposits follow—or separating means TK5 of the next deposit must directly follow. Any ascertained deviation from this order, in particular bank notes between information means IK4 and separating means TK5, indicates that an error has occurred in processing, which can be remedied by taking the measures explained below.

During processing of the deposits in bank note processing machine 100 the separator cards are distinguished from the bank notes and recognized due to their special features by sensor device 112 of bank note processing machine 100. Special features, e.g. magnetic or electroconductive stripes, and special evaluation methods coordinated therewith in sensor device 112 ensure that a separator card is reliably recognized even in the case of a multiple removal with double-sided masking by bank notes. The information on the information cards is likewise read by sensor device 112.

The presence of a further separator card indicates the end of processing of a first deposit and the beginning of a second deposit. The data of the stacked bank notes for the first deposit and the information on the affiliated information card are stored for later evaluation in control unit 140. The separator card and the affiliated information card are stacked in special output unit 130, 131 and separate the rejected bank notes of the first deposit from the rejected bank notes of the second deposit for later reworking, which can be done for example at a separate workplace.

When the end of a bank note stack with a plurality of deposits is reached the bank notes and the separator cards and information cards are removed from special output unit 130, 131 and manual reworking performed. This can be done on the bank note processing machine or at a separate workplace. The information on the information cards can be detected for example by means of a bar code reader. The worker removes the particular bank notes affiliated with an information card, assesses the bank notes according to their denomination and authenticity and enters these data. As soon as the worker has finished entering a deposit, the deposit value ascertained on the machine and that ascertained during manual reworking can be added up and compared with the set value entered during preparation and any deviation ascertained and logged.

To simplify manual reworking it is expedient to reduce the number of bank notes to be processed as far as possible. One possible solution is to feed the bank notes and separator cards stacked in special output unit 130, 131 and information cards to singler 111 and process them by machine again in a rerun. Experience has shown that more than half of the bank notes rejected in the first run are then recognized as authentic and stacked and accounted accordingly. This method requires that the order of separator cards, information cards and bank notes is not altered by singling, bank note transport or deposit, not even in the case of multiple removal. This can be attained by a special geometric design of transport system 120 and is dependent on singler 111 used.

Figure 5:
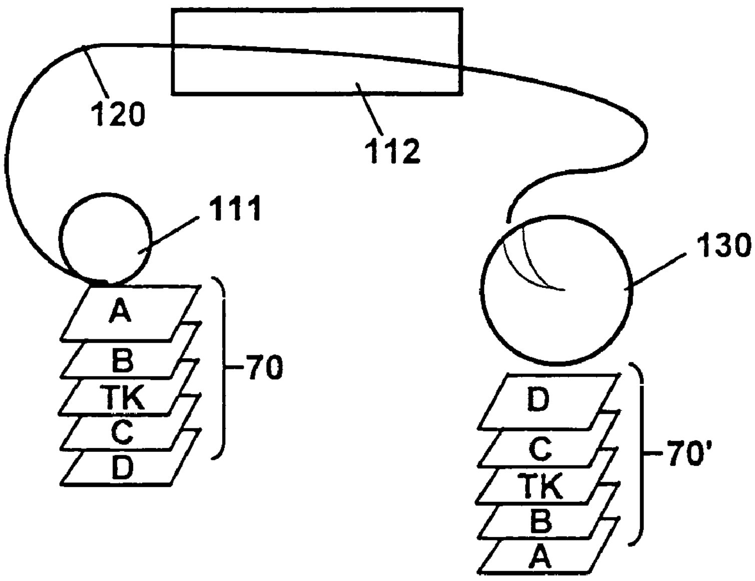
FIG. 5 shows a first embodiment of a bank note processing machine which does not alter the order of the sheet material during processing.
Figure 6:
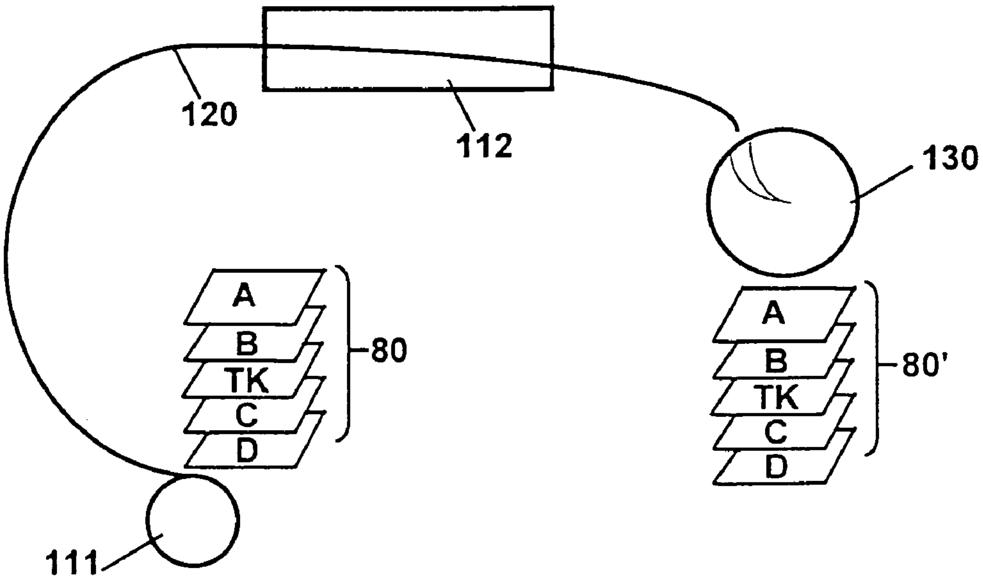
FIG. 6 shows a second embodiment of a bank note processing Machine which does not alter the order of the sheet material during processing.

FIGS. 5 and 6 show possible embodiments of transport system 120. Singler 111 shown in FIG. 5 which singles deposit 70 beginning with uppermost bank note A requires a reversal in transport system 120. The order of deposit 70' resulting in output unit 130 then corresponds to the original order of deposit 70. Before new singling, however, the stack of deposit 70' must be rotated by 180°. For singler 111 shown in FIG. 6 which single deposit 80 beginning with lowermost bank note D the initial order of deposit 80 results automatically in output unit 130 for deposit 80' stacked there.

It is also possible to perform several reruns in order to further reduce the number of documents remaining for manual reworking. Control unit 140 of bank note processing machine 100 adds up the results of the stacked bank notes of all runs for each deposit so that the repeated processing is not to be taken into account for the following processing steps and calculations.

In following steps for completing the accounting, the depositor receives a credit entry of the deposit value, a confirmation of the credit entry for the deposit or a correction of the credit entry with a deviation report for the deposit. Depending on the design of the system, this information can also be provided electronically, by fax or by sending a notice.

The invention claimed is:

1. A method for processing different successively processed groups of loose sheet material, comprising the following method steps:

separating the different groups of sheet material, and processing the separate groups of sheet material, said step of processing including examining the fitness or obtaining information of loose sheet material of each group of sheet material, wherein a separator card is used for separating the different groups of sheet material, and at least one information carrier is used for processing the different groups of sheet material and bears information specific to a group of sheet material, the separator card and the at least one information carrier being separate from one another.

2. A method according to claim 1, wherein the at least one information carrier is inserted at any points within the different groups of sheet material.

3. A method according to claim 1, wherein the separator card is inserted at the beginning of each different group of sheet material, and the at least one information carrier is inserted at the end of each different group of sheet material.

4. A method according to claim 1 or 3, wherein subgroups of sheet material are formed by using a plurality of information carriers within a group of sheet material.

5. A method according to claim 4, wherein the separator card and the at least one information carrier are brought together with the groups of sheet material at different places.

6. A method according to claim 4, wherein a deliverer of one or more groups of sheet material provides the at least one information carrier with information.

7. A method according to any one of claims 1, 2 or 3, wherein the separator card and the at least one information carrier are brought together with the groups of sheet material at different places.

8. A method according to claim 7, wherein a deliverer of one or more groups of sheet material provides the at least one information carrier with information.

9. A method according to any one of claims 1, 2 or 3, wherein a deliverer of one or more groups of sheet material provides the at least one information carrier with information.

10. Means for separating and processing different groups of loose sheet material transported in a sheet processing device, the means comprising;

at least one separator card arranged to provide an indication of a separate group of loose sheet material as the groups are successively transported in a sheet processing device; and at least one information carrier arranged to provide specific information concerning a group of loose sheet material as the groups are successively transported in a sheet processing device;

wherein the at least one separator card and the at least one information carrier are separate from one another.

11. Means according to claim 10, wherein the separator card-and/or the at least one information carrier are coded.

12. Means according to claim 11, wherein the coding of the separator card and/or the at least one information carrier comprise a magnetic and/or optical and/or electric and/or electronic coding.

13. Means according to one of claims 10 to 12, wherein the at least one information carrier is formed by part of the sheet material.

14. Means according to claim 10, wherein the at least one separator card possesses physical properties different from physical properties of the loose sheet material.

15. Means according to claim 10, wherein the groups of sheet material are defined by deposits of individual bank notes, said at least one information carrier bearing deposit data for an individual group of sheet material.

* * * * *